United States Patent [19]

Falk

[11] Patent Number: 4,659,679

[45] Date of Patent: Apr. 21, 1987

[54] INSULATIVE COMPOSITION AND METHOD OF MAKING ARTICLES THEREFROM

[76] Inventor: Richard A. Falk, 519 Westminster Dr., Waukesha, Wis. 53186

[21] Appl. No.: 694,857

[22] Filed: Jan. 25, 1985

[51] Int. Cl.[4] .................... C04B 35/14; C04B 14/04
[52] U.S. Cl. ...................... 501/99; 501/133; 501/154; 106/84; 106/98; 106/99; 106/104
[58] Field of Search .................. 501/99, 133, 95, 154; 106/98, 99, 104, 84

[56] References Cited

U.S. PATENT DOCUMENTS

| | | | |
|---|---|---|---|
| 1,363,879 | 12/1920 | Junghandel | 106/98 |
| 2,720,462 | 10/1955 | Jones | 501/133 |
| 4,105,459 | 8/1978 | Mehta | 106/89 X |
| 4,257,812 | 3/1981 | Johnson et al. | 501/95 |
| 4,295,891 | 10/1981 | Daussan et al. | 501/99 |
| 4,488,908 | 12/1984 | Goodwin et al. | 106/75 X |
| 4,571,389 | 2/1986 | Goodwin et al. | 106/75 X |

*Primary Examiner*—William R. Dixon, Jr.
*Assistant Examiner*—Karl Group
*Attorney, Agent, or Firm*—Fuller, Puerner & Hohenfeldt

[57] ABSTRACT

Disclosed herein is a method and composition of matter for constructing temperature resistant parts for the metal making industry from a mix of refractory fibers and Silca-carbon in the form of burned rice hull ash.

8 Claims, No Drawings

INSULATIVE COMPOSITION AND METHOD OF MAKING ARTICLES THEREFROM

FIELD OF THE INVENTION

The invention relates to a high temperature resistant material with variable structural properties and insulative characteristics particularly suitable for use with equipment used in the metal making industry and in foundries.

BACKGROUND OF THE INVENTION

In the past various refractory fiber products have been developed for use in high temperature applications. My U.S. Pat. Nos. 4,396,792 and 4,358,630, the subject matter of which is incorporated herein by reference are examples of the use of refractory fiber as a protective coating and structural member for small molten metal temperature measuring devices. Although these refractory fiber devices have provided good results; their useful life or test repeatability is limited. Also, the cost of refractory fiber is high thus limiting its usefulness for large items.

SUMMARY OF THE INVENTION

The invention provides an insulative refractory fiber composition with a wide range of uses in high temperature applications and temperature measuring devices. When used as a protective coating with molten metal samplers, it greatly enhances the immersion life and reduces the cost and acts as an anti-wetting agent to prevent adhering of molten metal to objects immersed in the bath such as spoon, molten metal sampling devices and bath temperature measuring devices. The composition of the invention is a blend of carbon, a filler, refractory fibers and a curing agent or refractory cement. The composition is molded or cast into the intended article. The source of the carbon can be rice hull ash which also provides an $SiO_2$ insulative filler. The filler is low cost and light weight. The ash also contains carbon which may be in the form of graphite. The properties of the composition can be varied by changing the aggregate size of the rice hull ash and the proportion of ash in relation to the amount of fiber and the type curing agent and cement. The properties are also controlled by blending powders and aggregates of different particle size. The refractory fiber provides strength to the finished products and abrasion resistance. With large aggregate size the insulative capabilities are increased because of trapped air. Also the large aggregates are less dense, hence increasing the utility of the composition for certain applications requiring large size castings.

The composition can be formed into the desired shape either by casting or vacuum forming with a slurry. The ash provides a source of carbon which when used at high temperatures will form carbon monoxide and or carbon dioxide which will provide an insulating blanket of gas to minimize heat conduction, adhering of molten metal to the structure and enhance the life of the article at high temperatures.

Tests have shown that the composition when used as a protective jacket for devices immersed in molten metal can increase the temperature resistance up to 3200 degrees F. of a particular refractory fiber product whereas without the carbon additive the effective temperature of the refractory fibers will be 2800 degrees F.

Further objects, advantages and features of the invention will be apparent from the disclosure.

DESCRIPTION OF PREFERRED EMBODIMENT

Although the disclosure hereof is detailed and exact to enable those skilled in the art to practice the invention, the physical embodiments herein disclosed merely exemplify the invention. The scope of the invention is defined in the claims appended hereto.

In the following examples, the source of silica and carbon is rice hull ash or expanded rice hull ash which is rice hull ash reburned at a higher temperature and containing from 18% to 2% carbon. A refractory fiber such as Kaowool manufactured by Babcock & Wilcox can be employed. For example, Kaowool 2600 bulk fiber which is 55% alumina and 44.9% silica can be employed in some applications. Curing agents can be anything from Portland Cement, sodium silicate to colloidal silicate or other high temperature Inorganic cements which are readily cured in the air or at elevated temperatures from 100 degrees to 500 degrees F. An example of high temperature cement is Secor high alumina cement with a rating of 3,000 degrees F. and above.

The properties for a particular product or application relating to hardness or brittleness, insulating ability, maximum operating temperatures, breaking and compression strength, resistance to abrasion may be varied by the percentages of the foregoing components. With increases in refractory cement, the resulting product will be harder and more brittle and also at the high end of the density range. Increase in refractory fiber will provide more resistance to breaking and crushing and provide increased abrasion resistance. Increases in the rice hull ash will provide a lighter and cheaper product with high insulating ability. The higher carbon content will provide greater anti-wetting properties with minimum penetration by the molten metal and iron into the product and higher temperature resistance. Higher carbon will result in greater gas evolution at the surface of the product to prevent heat transfer by conduction as well as other insulating properties. The following examples are illustrative of the appropriate product ranges for particular products. In some cases the products are cast and in other cases they are vacuum formed. A curing agent such as sodium silicate can be added later. For instance, in a standard vacuum drawing process, a slurry of the refractory fiber and the $SiO_2$ and C can be drawn against a screen with the water removed. The article is then immersed in a vessel of sodium silicate and a vacuum is again pulled to coat and penetrate the product with sodium silicate.

In a casting process, all ingredients can be blended and then poured into a mold in the shape of the desired article.

In the examples the mesh sizes of the ash are given where appropriate. Rice hull ash is available at 6-8 mesh with 94%-98% $SiO_2$ and 6%-2% carbon and at 325 mesh at 86% to 79% $SiO_2$ and 13% to 20% carbon. In the examples specific percentages were obtained or determined.

The use of powder of 325 mesh in the examples provides increased carbon to enhance the non-wetting characteristics because of the powders increased carbon content. The powder is also a good inexpensive filler which fills the spaces between the aggregates. The large particles of up to ⅛th inch provide the aggregate necessary to enable the cement to bond the particles into an integrated matrix.

The following specific compositions were formed and densities calculated.

Composition No. 1

9 lbs Secor Cement
7 lbs Large Expanded Rice Hulls
4 lbs High carbon fine black rice hulls—Producers
2 lbs 2700 degrees Long Fiber Kaowool
26 lbs Water Dried 48 hours—after 24 hours heated 12 hours 250 degrees for the 18% further weight loss.
Density 36 lbs per cu ft.

Composition No. 2

15 lbs Large Expanded Rice Hulls
15 lbs Small expanded rice hulls
15 lbs refractory cement
25 lbs Water Weight loss 32.9% on finished weight, after drying 48 hrs @110 degrees then 250 degrees for 12 hours.
Density 37.95 lbs per cu ft.

Composition No. 3

17 lbs Fine Black Rice Hull Ash
5 lbs refractory cement
Water quantity unknown

Weight loss 43% based on finished weight after 12 hours at 250 degrees.

Composition No. 4

13 lbs Large Rice Hull Ash
5 lbs refractory cement
Water quantity unknown

Weight loss 37% based on finished weight. Density 36.99 lbs per cu ft.

Specific examples for various illustrative products are as follows:

EXAMPLE No. 1

The following composition provided good results for a pouring spoon for taking iron and steel for various tests. Pouring spoons are typically available in sizes which range from 3½ inches to 10 inches in diameter. Pouring spoons have been used for many years in the industry. This composition is also suitable for use with immersion samplers and bath measuring devices as shown in my U.S. Pat. Nos. 3,805,621; 3,481,201; 3,748,908; 3,859,857; 3,996,803; 4,140,019; 3,905,238, the entire subject matter which is incorporated herein by reference. With the composition set forth herein, pouring spoons have been successfully vacuum formed. Satisfactory results have been provided with a composition comprising 50% 2,700 degrees F. refractory fiber and 50% $SiO_2$ - C powder. The $SiO_2$ - C powder is a burned and expanded rice hull ash having a composition 84% $SiO_2$, 15% C and 1% miscellaneous elements such as sodium and potassium. These ingredients are mixed in water and vacuum drawn into a screen mold followed by a drawing after immersing in a vessel of sodium silicate solution (Milwaukee solvents silicate 40–42) having a $Na_2O$ to $SiO_2$ weight ratio of 3/22, 9.1% Na 30%, $SiO_2$, a Baume of 30%. The mold then is secured immediately at 110 degrees F. for 24 hours. The resulting product had high temperature resistance at 3,000 degrees F., high crush strength and physical strength, average insulation ability, average density and high abrasion resistance. Also, the non-wetting properties with respect to molten metal were very high because of the high temperature of carbon Shrinkage is not critical.

EXAMPLE No. 2

Ladle or tundish, insulating cover for full or empty units. The foregoing product is made by casting, and comprises 30% Secor high alumina refractory cement, 30% $SiO_2$ - C powder, 325 mesh, and 40% $SiO_2$ - C ⅛th inch particle size retained by ⅛th inch mesh screen. The powder has 84% $SiO_2$, 15% carbon, 1% other elements. The ⅛th inch size particles comprised 96% $SiO_2$ and 3% carbon, 1% other elements. The foregoing are mixed with water and cast and cured for 48 hours at 110 degrees F. and then trimmed and formed into the desired shape. The ladle or tundish produced thereby has high insulation characteristics, high temperature capability, low cost, low density, average strength, average abrasion resistance and hardness and average non-wetting capability, also average crush resistance and rates poor in shrinkage, a property not important with this product.

EXAMPLE No. 3

Tundish liner board. This product is made by casting a composition which includes 25% high temperature refractory fiber, 20% Secor high alumina high temperature cement, 35% $SiO_2$ - C powder, which had a composition of 85% $SiO_2$ and 15% C and the balance 20% $SiO_2$ - C ⅛th inch 6–8 mesh with 97% $SiO_2$, and 3% C. The resulting product had good temperature resistance, good abrasion resistance, high density and was brittle but hard. It also had average breaking strength.

EXAMPLE No. 4

Ladle to tundish shroud or tundish to mold comprising 40% high temperature long refractory fibers, 50% $SiO_2$ - C powder, 325 mesh, 85% $SiO_2$, 15% C, 10% $SiO_2$ - C and 6–8 mesh with a silica carbon ratio of 95% $SiO_2$ and 5% carbon. After the product is formed, sodium silicate cement was applied with the vacuum process recited above regarding Example 1. The resulting product had high resistance to abrasion, good non-wetting characteristics, high strength, hardness, high temperature resistance and crush resistance. The product had low density, insulation value was average, shrinkage was poor.

EXAMPLE No. 5

Ingot stool covers, ingot seals and ingot stool coating formed by-vacuum forming. The composition included 17.5% of high temperature refractory fiber, 40% $SiO_2$ - C, 85% $SiO_2$, 15% C powder, 42½% $SiO_2$ - C 6–8 mesh having a composition 98% $SiO_2$, 2% carbon. The resulting product was cured with sodium silicate as in Example 1 with a Baume of 30%. The resulting product had good non-wetting properties, good temperature resistance, good breaking strength, average cost, poor crush strength, poor abrasion resistance, poor insulation characteristics, poor shrinkage and hardness.

EXAMPLE No. 6

Insulating block for a wide range of uses including structural uses, the block formed by casting in a mold the following composition: 30% Secor high temperature alumina cement or Portland cement depending on application and if high temperature resistant characteristics are not required, 30% 6–8 mesh $SiO_2$ - C at a ratio of 95% $SiO_2$ to 5% carbon, 35% ⅛th inch particle size $SiO_2$ - C, comprised of 97% $SiO_2$, 3% carbon and 5% high temperature refractory fiber mixed with water cast and formed by sawing blocks. The properties are good insulation characteristics, low density and cost, high temperature resistance, average crush resistance, abrasion resistance and hardness, poor braking strength, shrinkage and non-wetting capabilities.

The foregoing examples and tests performed on these products revealed that the anti-wetting capability of graphite together with its formation of CO and/or $CO_2$ when contacted by molten metal provide the desirable temperature resistance.

The cost savings, temperature resistance and insulation capability as well as the weight and strength characteristics make the foregoing compositions suitable for a wide range of products including those employed in the molten metal and metal smelting business. As indicated, some of these compositions and the ones that use refractory cement are readily cast in a manner similar to concrete. All the products can be worked or machined with woodworking or metal working machinery.

I claim:

1. A composition of matter comprising by weight: 30%-75% of rice hull ash compound of 85%-95% $SiO_2$ and 15%-5% C; 65%-20% refractory fiber and the balance refractory cement.

2. A method of forming a refractory fiber product comprising the steps of providing a slurry of water and rice hull ash comprised of 85%-95% $SiO_2$ and 15%-5% C; 70%-20% by weight of the ash refractory fiber; applying the mix to the inside of a vacuum mold; applying vacuum to draw the mix against the screen to remove the moisture therefrom and form an internal sleeve; adding a curing agent and drying the finished product at temperatures in the range of 100 degrees F. to 500 degrees F.

3. A composition for the housing of a molten metal sampler or the like comprising by weight: 50% refractory fiber; 50% powdered rice hull ash comprised of 84% $SiO_2$, 15% C and 1% other elements and refractory cement to bond said composition together.

4. A composition for a ladle cover or the like comprising by weight: 30% high temperature refractory cement; 30% of 325 mesh $SiO_2$ - C rice hull ash powder; 40% $SiO_2$ - C ⅛th inch expanded rich hull ash granules with a particle size retained by ⅛th inch mesh screen and wherein said powder is comprised of 84% $SiO_2$, 15% carbon, 1% other elements and the granules comprise 96% $SiO_2$, 3% carbon and 1% other elements.

5. A high temperature resistant board comprising by weight: 25% high temperature refractory fiber; 20% high temperature refractory cement; 35% $SiO_2$ - C rice hull ash powder, 325 mesh, said powder comprised of 86%-79% $SiO_2$ and 13%-20% C; and, 20% $SiO_2$ - C ⅛th inch particles 6-8 mesh comprised of 94%-98% $SiO_2$ and 6%-2% C.

6. A composition for a ladle or the like comprising by weight: 40% high temperature long refractory fibers; 50% $SiO_2$ - C rice hull ash powder, 325 mesh, comprised of 86%-79% $SiO_2$ and 13%-20% C, 10% $SiO_2$ - C expanded rice hull ash granules at 6-8 mesh with a silica-carbon ratio of 94%-98% $SiO_2$ and 6%-2% carbon; and refractory cement to bond said composition together.

7. A high temperature resistant composition for ingot stool covers or the like comprising by weight: 17½% of high temperature refractory fiber; 42½% $SiO_2$ - C rice hull ash comprised of 85% $SiO_2$ -15% C powder, 325 mesh; 42½% $SiO_2$ - C expanded rice hull ash granules 6-8 mesh, said granules comprised of 94%-98% $SiO_2$, 6%-2% C; and refractory cement to bond said composition together.

8. A composition for structural members consisting by weight: 30% cement selected from the group consisting of refractory cement or Portland cement; 30% 6-8 mesh rice hull ash containing $SiO_2$ - C comprised of 95% $SiO_2$ and 5% carbon; 35% ⅛th inch particle size $SiO_2$ -C comprised of 94%-98% $SiO_2$ and 6%-2% C and 5% high temperature refractory fiber.

* * * * *

UNITED STATES PATENT AND TRADEMARK OFFICE
CERTIFICATE OF CORRECTION

PATENT NO. : 4,659,679
DATED : April 21, 1987
INVENTOR(S) : Richard A. Falk

It is certified that error appears in the above—identified patent and that said Letters Patent is hereby corrected as shown below:

Column 5, Line 26, delete "compound" and substitute
  therefor ----composed----
Column 5, Line 35, delete "internal" and substitute
  therefor ----integral----

Signed and Sealed this

Twentieth Day of October, 1987

Attest:

DONALD J. QUIGG

*Attesting Officer*     *Commissioner of Patents and Trademarks*